United States Patent
Li et al.

(10) Patent No.: US 11,485,316 B2
(45) Date of Patent: Nov. 1, 2022

(54) LOCK COMMUNICATION SYSTEM AND METHOD FOR SHARED BICYCLE

(71) Applicant: HANGZHOU QINGQI SCIENCE AND TECHNOLOGY CO., LTD., Zhejiang (CN)

(72) Inventors: Gang Li, Hangzhou (CN); Guotai He, Hangzhou (CN); Meimiao Feng, Hangzhou (CN); Xiaoyun Zhou, Hangzhou (CN); Sheng Liu, Hangzhou (CN)

(73) Assignee: HANGZHOU QINGQI SCIENCE AND TECHNOLOGY CO., LTD., Hangzhou (CN)

( * ) Notice: Subject to any disclaimer, the term of this patent is extended or adjusted under 35 U.S.C. 154(b) by 455 days.

(21) Appl. No.: 16/784,454

(22) Filed: Feb. 7, 2020

(65) Prior Publication Data

US 2020/0172051 A1    Jun. 4, 2020

Related U.S. Application Data

(63) Continuation of application No. PCT/CN2018/089634, filed on Jun. 1, 2018.

(30) Foreign Application Priority Data

Aug. 7, 2017 (CN) .......................... 201710668030.3
Feb. 6, 2018 (CN) .......................... 201810119287.8

(51) Int. Cl.
  *B60R 25/20*   (2013.01)
  *G07C 9/00*    (2020.01)
  *B62H 5/00*    (2006.01)
  *H04W 4/14*    (2009.01)
  *H04W 52/02*   (2009.01)

(52) U.S. Cl.
  CPC ........... *B60R 25/2018* (2013.01); *B62H 5/00* (2013.01); *G07C 9/00571* (2013.01); *H04W 4/14* (2013.01); *H04W 52/028* (2013.01)

(58) Field of Classification Search
  CPC ........ B60R 25/2018; B62H 5/00; B62H 5/20; G07C 9/00571; G07C 2009/00634;
  (Continued)

(56) References Cited

U.S. PATENT DOCUMENTS 9,161,310 B2    10/2015 Bahl et al.
11,055,804 B2 *  7/2021 Li ........................ G06Q 20/4015
(Continued)

FOREIGN PATENT DOCUMENTS

CN    103297934 A    9/2013
CN    203271358 U    11/2013
(Continued)

OTHER PUBLICATIONS

The Extended European Search Report in European Application No. 18845247.8 dated Jun. 26, 2020, 8 pages.
(Continued)

*Primary Examiner* — Seung H Lee
(74) *Attorney, Agent, or Firm* — Metis IP LLC

(57) ABSTRACT

A lock communication system may include a server and a lock controller disposed on a shared bicycle. The lock controller may include a main control module and a network module. The main control module may control a periodic heartbeat of the network module and maintain a constant connection between the network module and the server. The lock controller may further include a power supply and a short message module which are connected to the main control module. The main control module may obtain electricity from the power supply, and enter a power saving mode when the electricity quantity left in the power supply is lower than a preset threshold, or otherwise enter a normal mode.

20 Claims, 4 Drawing Sheets

(58) Field of Classification Search
CPC ....... H04W 4/14; H04W 52/028; H04W 4/70; H04W 4/44; G07B 15/02; Y02D 30/70; G06F 1/3212; G06F 1/3287; H04L 43/10; H04L 69/40
See application file for complete search history.

(56) References Cited

U.S. PATENT DOCUMENTS

| | | |
|---|---|---|
| 2007/0189251 A1 | 8/2007 | Hou |
| 2010/0325470 A1 | 12/2010 | Underwood et al. |
| 2015/0330113 A1 | 11/2015 | Van Wiemeersch et al. |
| 2017/0324539 A1 | 11/2017 | Liu et al. |

FOREIGN PATENT DOCUMENTS

| | | |
|---|---|---|
| CN | 103632451 A | 3/2014 |
| CN | 103199311 B | 8/2015 |
| CN | 106892038 A | 5/2017 |
| CN | 106875520 A | 6/2017 |
| CN | 106934832 A | 7/2017 |
| CN | 107093127 S | 8/2017 |

OTHER PUBLICATIONS

International Search Report in PCT/CN2018/089634 dated Aug. 20, 2018, 6 Pages.
Written Opinion in PCT/CN2018/089634 dated Aug. 20, 2018, 8 Pages.

\* cited by examiner

LOCK COMMUNICATION SYSTEM AND METHOD FOR SHARED BICYCLE

CROSS-REFERENCE TO RELATED APPLICATIONS

This application is a continuation of International Application No. PCT/CN2018/089634, filed on Jun. 1, 2018, which claims priority of Chinese Patent Application No. 201810119287.8 filed on Feb. 6, 2018, and Chinese Patent Application No. 201710668030.3 filed on Aug. 7, 2017, the entire contents of each of which are hereby incorporated by reference.

TECHNICAL FIELD

The present disclosure generally relates to shared bicycles, and in particular, relates to lock communication systems and methods for shared bicycles.

BACKGROUND

With the development of the Internet era, shared vehicles, for example, shared bicycles, shared cars, have gained rapid popularization. The abovementioned shared vehicles satisfy general travelling requirements of common people quite well, thereby becoming popular among the common people and playing a more and more important role in their lives.

However, such emerging shared vehicles, especially the shared bicycles, adopt electronic locks and have a network function, an alarming function, or the like, which results in large power consumption. Though a solar charging panel can be used to act as a charging source to supply electricity to the shared bicycles, in some dark places where sunlight cannot reach or in an overcast day, there is still a difficulty in charging the shared bicycles. Therefore, the power consumption has always been one of vital factors that restrict the development of the shared bicycles.

As to the power consumption of the shared bicycles, the most power is consumed to perform the network function, particularly to turn on a network module periodically to ensure a constant connection of the network module. With the development of the techniques or an optimization of a program, an optimal turning-on frequency of the network module is changed and optimized constantly. Reducing the turning-on frequency may reduce the power consumption greatly. Thus, the management has been focused on how to reduce the turning-on frequency.

SUMMARY

The present disclosure is intended to, against the abovementioned defects in the prior art, provide a lock communication system for a shared bicycle, so as to solve a problem with respect to the large power consumption of the shared bicycle.

The present disclosure is intended to, against the abovementioned defects in the prior art, provide a lock communication method for the shared bicycle, so as to solve the problem with respect to the large power consumption of the shared bicycle.

The present disclosure provides technical solutions to solve the technical problem. The present disclosure may provide a lock communication system for a shared bicycle. The lock communication system may include a server and a lock controller disposed on the shared bicycle. The lock controller may include a main control module and a network module. The main control module may control a periodic heartbeat of the network module, and maintain a constant connection between the network module and the server. The lock controller may further include a power supply and a short message module which are connected to the main control module. The main control module may obtain electricity from the power supply, and enter a power saving mode when the electricity quantity left in the power supply is lower than a preset threshold, or otherwise enter a normal mode.

In the normal mode, the main control module may turn on a heartbeat mode of the network module, obtain unlocking information of the server via the network module, and report unlocking confirmation information to the server via the network module.

In the power saving mode, the main control module may turn off the heartbeat mode of the network module. The lock controller may obtain the unlocking information of the server via the network module, and report the unlocking confirmation information to the server via the network module.

In some embodiments, the server may include a short message gateway, via which the server may send the unlocking information in form of a short message to the short message module of the lock controller.

In some embodiments, the main control module may control the network module to implement a Message Queuing Telemetry Transport (MQTT) heartbeat via an MQTT protocol.

In some embodiments, a frequency of the MQTT heartbeat may be in a range from 5 to 10 minutes per time.

In some embodiments, the preset threshold may be in a range from 50% to 85% of total electricity quantity in the power supply.

In some embodiments, the network module may be a mobile communication module. The short message module and the mobile communication module may share a communication chip and an antenna. The communication chip may be connected to the main control module and the antenna, respectively.

In some embodiments, the main control module may include a timing sub-module. The timing sub-module may include a preset time. The main control module may obtain the electricity from the power supply periodically according to the preset time.

In some embodiments, the lock communication system may further include a smart terminal and quick response (QR) code information set on the shared bicycle. The QR code information may include encoding information matched with the lock controller. The smart terminal may be connected to the server and send the encoding information to the server by scanning the QR code information. The server may control the corresponding lock controller to unlock a lock of the shared bicycle based on an unlocking instruction sent by the smart terminal and the encoding information.

The present disclosure provides technical solutions to solve the technical problem. The present disclosure may provide a lock communication method for a shared bicycle. The shared bicycle may include a lock controller disposed on the shared bicycle. The lock controller may include a main control module and a network module. The main control module may control a periodic heartbeat of the network module, and maintain a constant connection between the network module and the server. The lock controller may further include a power supply and a short message module which are connected to the main control module. The lock communication method may include one or more of the following operations.

The main control module may obtain electricity from the power supply, and enter a power saving mode when the electricity quantity left in the power supply is lower than a preset threshold, or otherwise enter a normal mode.

In the normal mode, the main control module may turn on a heartbeat mode of the network module, obtain unlocking information of the server via the network module, and report unlocking confirmation information to the server via the network module.

In the power saving mode, the main control module may turn off the heartbeat mode of the network module. The lock controller may obtain the unlocking information of the server via the network module, and report the unlocking confirmation information to the server via the network module.

In some embodiments, when the main control module turns off the heartbeat mode of the network module, the network module may disconnect from the server. After the network module disconnects from the server, the server may automatically send the unlocking information in form of a short message to the lock controller. The unlocking information may be received by the short message module of the lock controller.

Compared to the prior art, the benefits of the present disclosure may include: by designing lock communication systems and methods for a shared bicycle, a communication mode may be controlled based on the electricity in the power supply, and network communication with a large power consumption can be replaced by short message communication, thereby reducing the power consumption; by switching the main control module between two modes, the user experience may be improved, the power consumption may be reduced, the sustainable development capability of the shared bicycle may be improved, the recycling and maintenance costs of the shared bicycle may be reduced, and an overall operating efficiency of the enterprise may be improved.

BRIEF DESCRIPTION OF THE DRAWINGS

The present disclosure is further described in terms of drawings and exemplary embodiments. Among the drawings.

DETAILED DESCRIPTION

Exemplary embodiments are described in detail with reference to the drawings.

Figure 1:
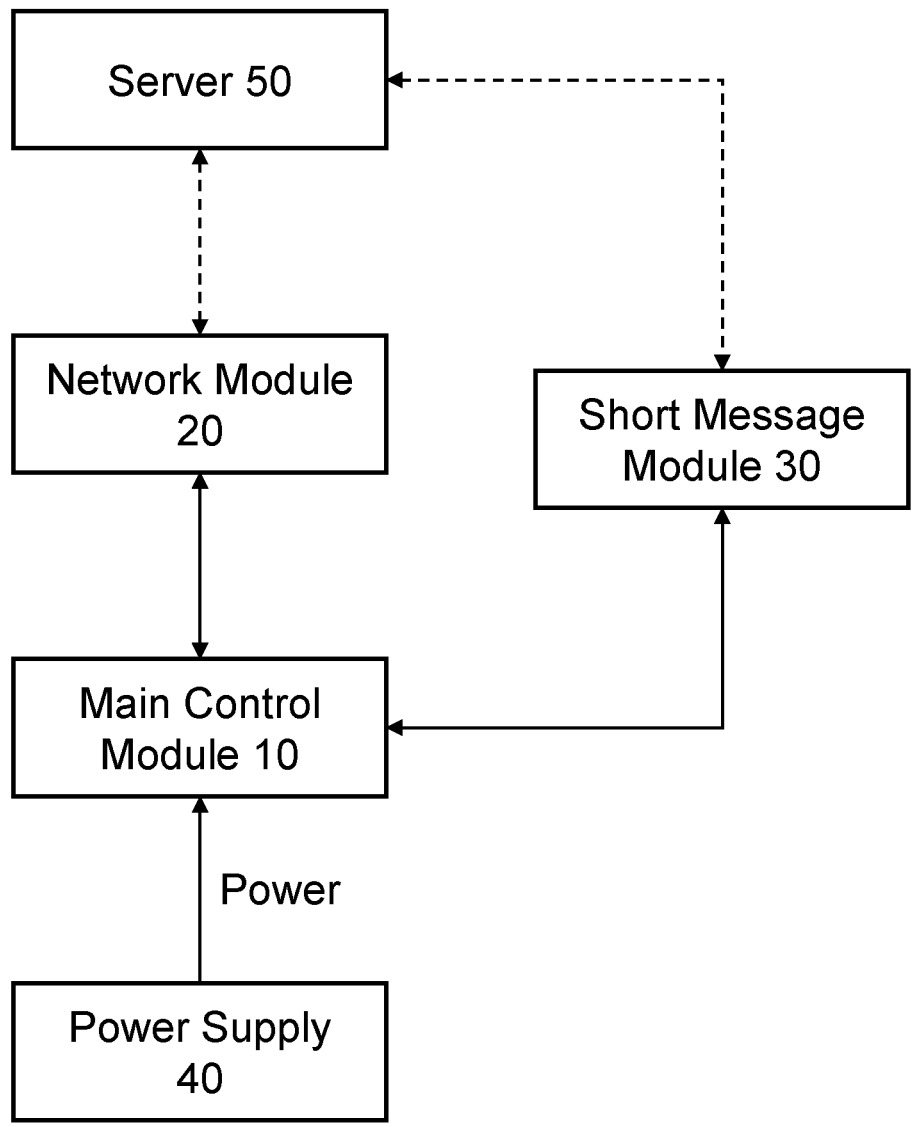
FIG. 1 is a schematic diagram illustrating an exemplary lock communication system for a shared bicycle of the present disclosure.

As shown in FIG. 1, the present disclosure provides an embodiment of a lock communication system for a shared bicycle.

The lock communication system for the shared bicycle may include a server 50 and a lock controller disposed on the shared bicycle. The lock controller may include a main control module 10 and a network module 20. The main control module 10 may control a periodic heartbeat of the network module 20, and maintain a constant connection between the network module 20 and the server 50. The lock controller may further include a power supply 40 and a short message module 30 which are connected to the main control module 10. The main control module 10 may obtain electricity from the power supply 40, and enter a power saving mode when the electricity quantity left in the power supply is lower than a preset threshold, or otherwise enter a normal mode. In the normal mode, the main control module 10 may turn on a heartbeat mode of the network module 20, obtain unlocking information of the server 50 via the network module 20, and report unlocking confirmation information to the server 50 via the network module 20. In the power saving mode, the main control module 10 may turn off the heartbeat mode of the network module 20. The lock controller may obtain the unlocking information of the server 50 via the short message module 30, and report the unlocking confirmation information to the server 50 via the network module 20.

When the main control module 10 turns off the hearbeat mode of the network module 20, the network module 20 may disconnect from the server 50 in a certain time period. After the network module 20 disconnects from the server 50, the server 50 may automatically send the unlocking information in form of a short message to the lock controller. The unlocking information may be reserved by the short message module 30 of the lock controller.

Specifically, the main control module 10 may control the network module 20 to implement a Message Queuing Telemetry Transport (MQTT) heartbeat via an MQTT protocol, and maintain a constant connection between the network module 20 and the server 50. MQTT is an instant messaging protocol developed by International Business Machine (IBM) and may possibly become an important part of the Internet of Things. The protocol may support a plurality of platforms and can connect a plurality of networked items to the outside, and may be used as a communication protocol for sensors and actuators (for example, connecting houses via Twitter).

In general, the main control module 10 may maintain a normally activated state of the network module 20 via the MQTT heartbeat. When a user uses a shared bicycle, the network module 20 may quickly make response and connect with the server 50 to improve the user experience. Further, the network module 20 may be a mobile communication module. In some embodiments, the mobile communication module may be a 2G communication module, a 3G communication module, or a 4G communication module, or the like.

In some embodiments, when the main control module 10 enters the power saving mode, the server 50 may send a short message to the short message module 30, which reduces the power consumption of the shared bicycle, improves the sustainable development capability of the shared bicycle, and reduces the recycling and maintenance costs. After the server 50 sends the short message to the short message module 30, the corresponding network module 20 may be activated. When the unlocking confirmation information is reported, the unlocking confirmation information may be sent directly to the server 50 via the network module 20.

In addition, the short message module 30 and the network module 20 may share a communication chip and an antenna, and the communication chip may be connected to the main control module 10 and the antenna, respectively. When the short message module 30 receives the short message, the communication chip may be activated, that is, the network module 20 in the communication chip may be activated. Further, the main control module 10 may also be or include a processing chip. The processing chip may be connected to the communication chip to control the communication chip, for example, to control the communication chip to turn on or off the MQTT heartbeat, and to perform data transmission.

In some embodiments, the processing chip, the communication chip, and the antenna may be disposed on the same circuit board, and disposed in a control housing of the lock controller. The control housing may also include a bicycle lock and a motor that controls the unlocking and locking of the bicycle lock. The processing chip may also be connected to the motor, so as to control the motor to unlock the bicycle lock according to the unlocking information.

In one embodiment, a frequency of the MQTT heartbeat of the network module 20 may be in a range from 5 to 10 minutes per time. The preset threshold may be in a range from 50% to 85% of total electricity quantity in the power supply 40. Of course, the above-mentioned frequency of the MQTT heartbeat and the preset threshold may be adjusted according to actual needs to facilitate the use of shared bicycles.

In one embodiment, the main control module 10 may include a timing sub-module. The timing sub-module may include a preset time, and the main control module 10 may obtain the electricity from the power supply 40 according to the preset time. Of course, the above preset time may be adjusted according to actual needs to facilitate the use of shared bicycles.

Figure 2:
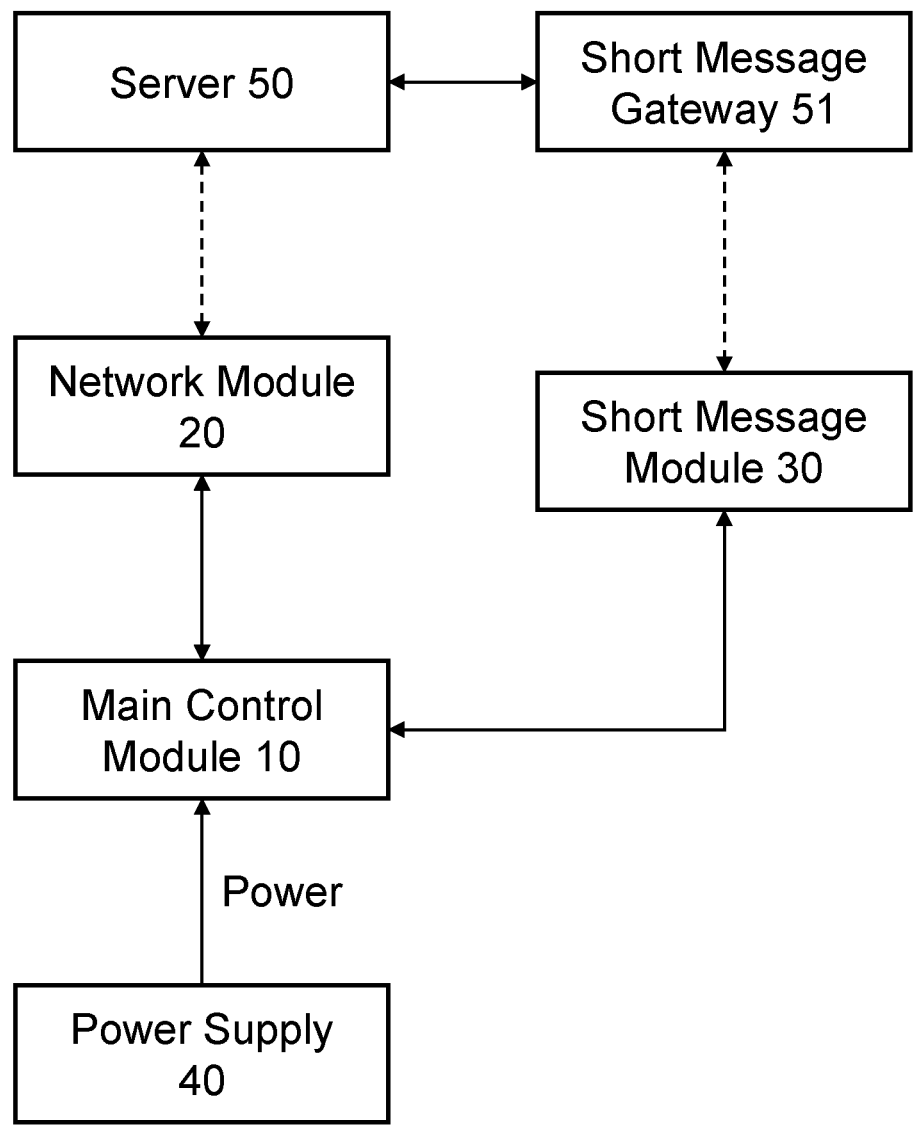
FIG. 2 is an exemplary structural schematic diagram of FIG. 1.

As shown in FIG. 2, the present disclosure provides another embodiment of a lock communication system for a shared bicycle.

The server 50 may include a short message gateway 51, via which the server 50 may send the unlocking information in form of a short message to the short message module 30 of the lock controller.

That is, the short message gateway 51 may transform the unlocking information into a short message, and send the unlocking information in form of the short message to the short message module 30 of the lock controller.

Figure 3:
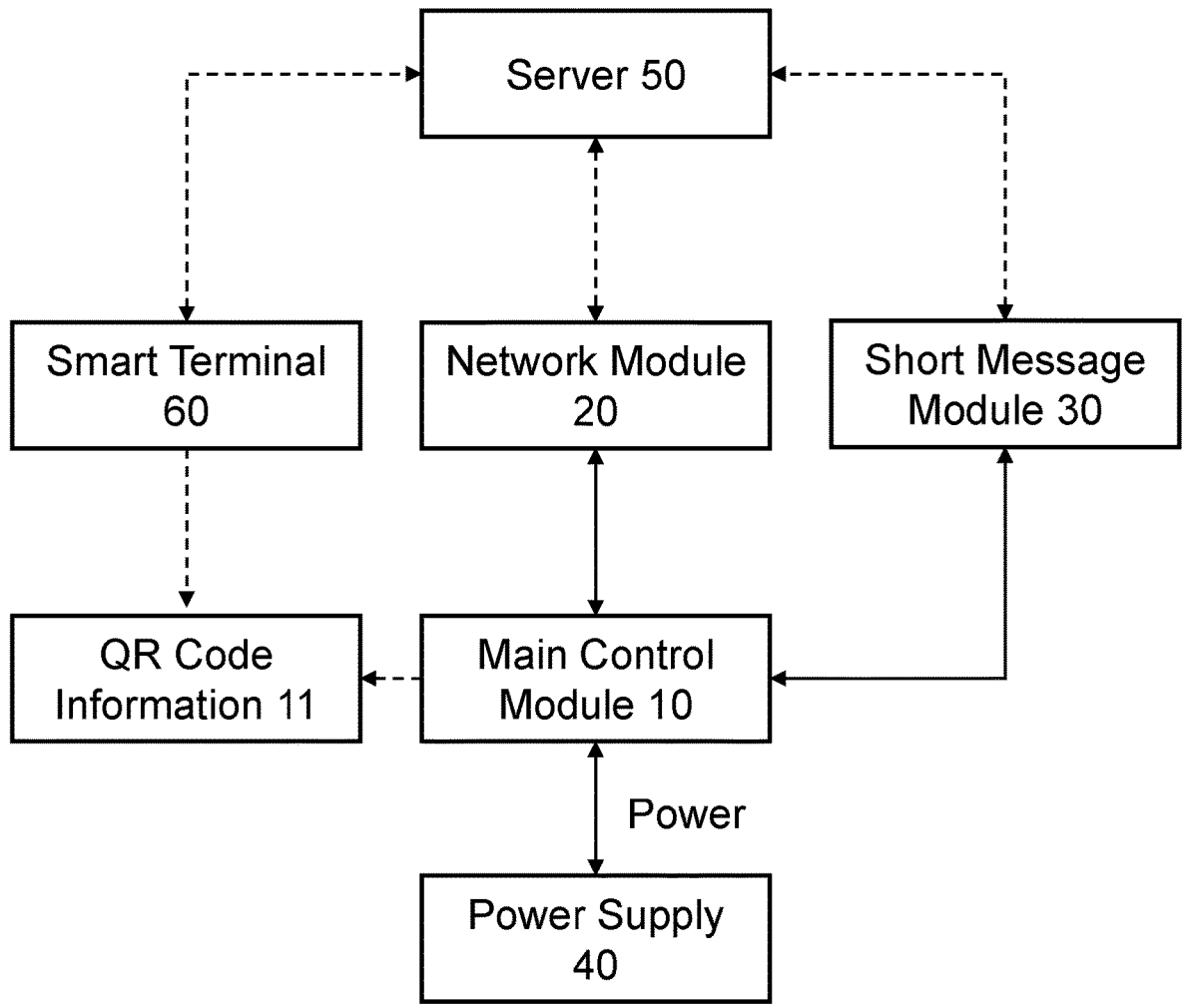
FIG. 3 is a schematic diagram illustrating an exemplary lock communication system based on a smart terminal of the present disclosure.

As shown in FIG. 3, the present disclosure provides another embodiment of a lock communication system based on a smart terminal.

The lock communication system may further include a smart terminal 60 and quick response (QR) code information 11 set on the shared bicycle. The QR code information 11 may include encoding information matched with the lock controller. The smart terminal 60 may be connected to the server 50 by scanning the QR code information 11, and send the encoding information to the server 50. The server 50 may control the corresponding lock controller to unlock the bicycle lock of the shared bicycle according to an unlocking instruction sent by the smart terminal 60 and the encoding information.

The QR code information 11 may be set on the shared bicycle, such as the lock controller or a location next to the lock controller, so that the smart terminal 60 can scan the QR code information.

In some embodiments, the smart terminal 60 may include a mobile phone, a tablet, or the like, and have a corresponding software program installed therein. The smart terminal 60 may obtain corresponding encoding information through a QR code recognition module of the software program, such as a camera or recognition software.

Figure 4:
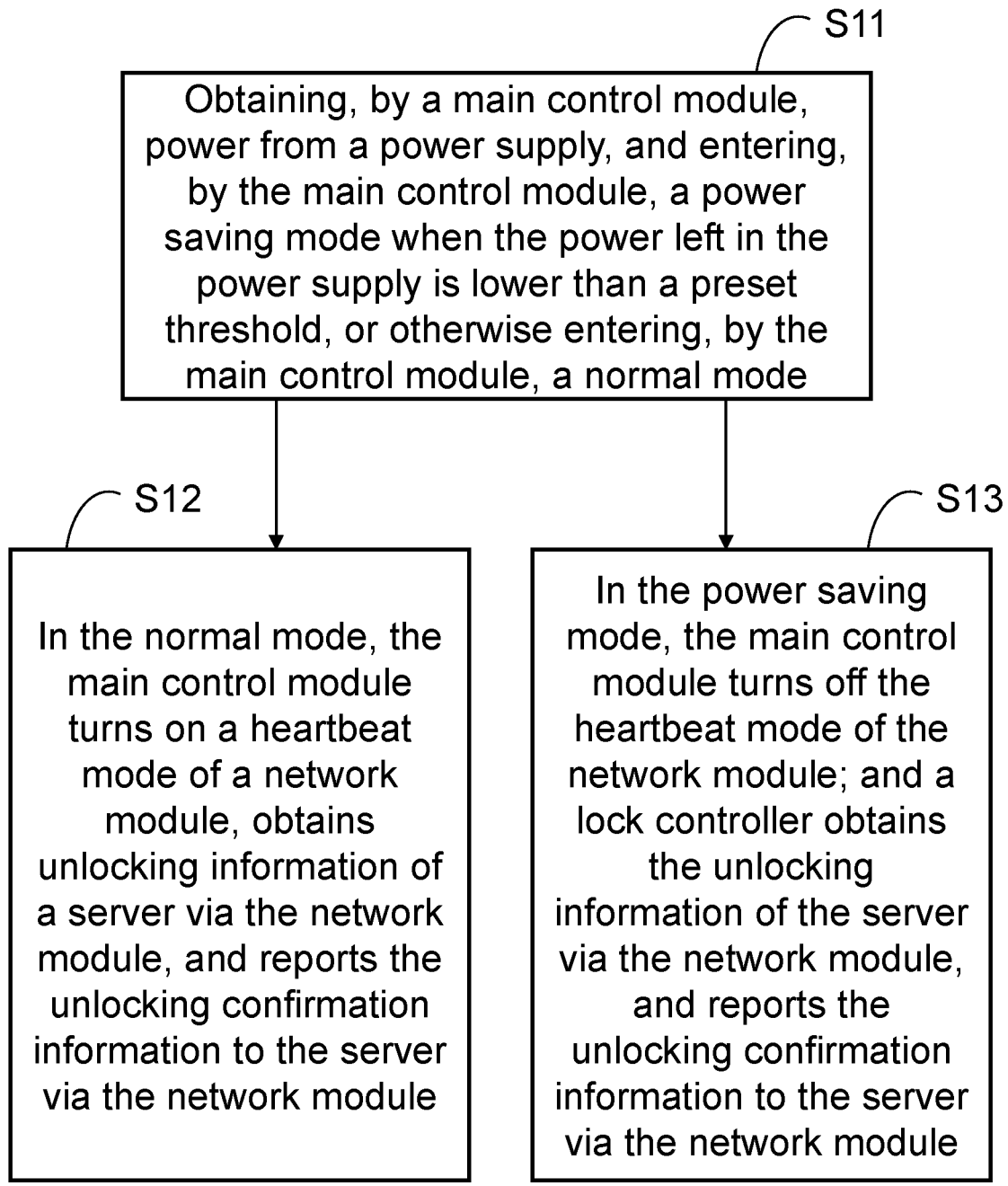
FIG. 4 is a schematic diagram illustrating an exemplary lock communication method for the shared bicycle of the present disclosure.

As shown in FIG. 4, the present disclosure provides an embodiment of a lock communication method for the shared bicycle.

The lock communication method for the shared bicycle is provided herein. The shared bicycle may include a lock controller disposed on the shared bicycle. The lock controller may include the main control module and the network module. The main control module may control the periodic heartbeat of the network module, and maintain the constant connection between the network module and the server. The lock controller may further include the power supply and the short message module which are connected to the main control module. The lock communication method may include one or more of the following operations.

In S11, the main control module may obtain the electricity from the power supply, and enter the power saving mode when the electricity quantity left in the power supply is lower than the preset threshold, or otherwise enter the normal mode.

In S12, in the normal mode, the main control module may turn on the heartbeat mode of the network module, obtain the unlocking information of the server via the network module, and report the unlocking confirmation information to the server via the network module.

In S13, in the power saving mode, the main control module may turn off the heartbeat mode of the network module. The lock controller may obtain the unlocking information of the server via the network module, and report the unlocking confirmation information to the server via the network module.

Further, when the main control module turns off the heartbeat mode of the network module, the network module may disconnect from the server, after which the server may automatically send the unlocking information in form of a short message to the lock controller. The unlocking information may be received by the short message module of the lock controller.

The above descriptions are only exemplary embodiments of the present disclosure, and are not intended to limit the scope of the present invention. Any equivalent change or modification made in accordance with the scope of the claims for the present disclosure does not depart the scope of the present disclosure.

What is claimed is:

1. A lock communication system for a shared bicycle, comprising a server and a lock controller disposed on the shared bicycle, the lock controller including a main control module and a network module, the main control module being configured to control a periodic heartbeat of the network module, and maintain a constant connection between the network module and the server, wherein the lock controller further includes a power supply and a short message module which are connected to the main control module, the main control module is further configured to obtain electricity from the power supply, and enter a power saving mode when the electricity quantity left in the power supply is lower than a preset threshold, or otherwise enter a normal mode; and wherein, in the normal mode, the main control module is further configured to turn on a heartbeat mode of the network module, obtain unlocking information of the server via the network module, and report unlocking confirmation information to the server via the network module;

in the power saving mode, the main control module is further configured to turn off the heartbeat mode of the network module; and the lock controller is configured to obtain the unlocking information of the server via the short message module, and report the unlocking confirmation information to the server via the network module.

2. The lock communication system of claim 1, wherein the server includes a short message gateway, and the server is configured to send, via the short message gateway, the unlocking information in form of a short message to the short message module of the lock controller.

3. The lock communication system of claim 1, wherein the main control module is further configured to control the network module to implement a Message Queuing Telemetry Transport (MQTT) heartbeat via an MQTT protocol.

4. The lock communication system of claim 3, wherein a frequency of the MQTT heartbeat is in a range from 5 to 10 minutes per time.

5. The lock communication system of claim 1, wherein the preset threshold is in a range from 50% to 85% of total electricity quantity in the power supply.

6. The lock communication system of claim 1, wherein the network module is a mobile communication module; and the short message module and the mobile communication module share a communication chip and an antenna, the communication chip being connected to the main control module and the antenna, respectively.

7. The lock communication system of claim 6, wherein the main control module includes a processing chip; and the processing chip, the communication chip, and the antenna are disposed on a same circuit board in a control housing of the lock controller.

8. The lock communication system of claim 1, wherein the main control module includes a timing sub-module, the timing sub-module including a preset time, and the main control module is configured to obtain the electricity from the power supply periodically according to the preset time.

9. The lock communication system of claim 1, wherein the lock communication system further includes a smart terminal and quick response (QR) code information set on the shared bicycle, the QR code information including encoding information matched with the lock controller, the smart terminal being configured to be connected to the server by scanning the QR code information and sending the encoding information to the server, the server being configured to control the corresponding lock controller to unlock a lock of the shared bicycle according to an unlocking instruction sent by the smart terminal and the encoding information.

10. The lock communication system of claim 1, wherein the network module is configured to disconnect from the server when the main control module turns off the heartbeat mode of the network module; and
the server is configured to automatically send, after the network module disconnects from the server, the unlocking information in form of a short message to the lock controller, the unlocking information being received by the short message module of the lock controller.

11. A lock communication method for a shared bicycle, the shared bicycle comprising a lock controller disposed on the shared bicycle, the lock controller including a main control module and a network module, the main control module being configured to control a periodic heartbeat of the network module, and maintain a constant connection between the network module and a server, wherein the lock controller further includes a power supply and a short message module which are connected to the main control module, the lock communication method comprising:

obtaining, by the main control module, electricity from the power supply, and entering, by the main control module, a power saving mode when the electricity quantity left in the power supply is lower than a preset threshold, or otherwise entering, by the main control module, a normal mode; wherein,
in the normal mode, the main control module is further configured to turn on a heartbeat mode of the network module, obtain unlocking information of the server via the network module, and report unlocking confirmation information to the server via the network module;
in the power saving mode, the main control module is further configured to turn off the heartbeat mode of the network module; and the lock controller is configured to obtain the unlocking information of the server via the network module, and report the unlocking confirmation information to the server via the network module.

12. The lock communication method of claim 11, wherein the lock communication method further comprises:
when the main control module turns off the heartbeat mode of the network module, disconnecting, by the network module, from the server,
after the network module disconnects from the server, sending, by the server, automatically the unlocking information in form of a short message to the lock controller, the unlocking information being received by the short message module of the lock controller.

13. The lock communication method of claim 11, wherein the server includes a short message gateway; and
the server is configured to send, via the short message gateway, the unlocking information in form of a short message to the short message module of the lock controller.

14. The lock communication method of claim 11, wherein the main control module is further configured to control the network module to implement a Message Queuing Telemetry Transport (MQTT) heartbeat via an MQTT protocol.

15. The lock communication method of claim 14, wherein a frequency of the MQTT heartbeat is in a range from 5 to 10 minutes per time.

16. The lock communication method of claim 11, wherein the preset threshold is in a range from 50% to 85% of total electricity quantity in the power supply.

17. The lock communication method of claim 11, wherein the network module is a mobile communication module; and
the short message module and the mobile communication module share a communication chip and an antenna, the communication chip being connected to the main control module and the antenna, respectively.

18. The lock communication method of claim 17, wherein the main control module includes a processing chip; and
the processing chip, the communication chip, and the antenna are disposed on a same circuit board in a control housing of the lock controller.

19. The lock communication method of claim 11, wherein the main control module includes a timing sub-module, the timing sub-module including a preset time; and
the main control module is configured to obtain the electricity from the power supply periodically according to the preset time.

20. The lock communication method of claim 11, wherein the shared bicycle further includes quick response (QR) code information, the QR code information including encoding information matched with the lock controller;
a smart terminal is associated with the shared bicycle, the smart terminal being configured to be connected to the server by scanning the QR code information and sending the encoding information to the server; and the server is configured to control the corresponding lock controller to unlock a lock of the shared bicycle according to an unlocking instruction sent by the smart terminal and the encoding information.

\* \* \* \* \*